March 16, 1954 M. VÉRON 2,672,012
COMBUSTION CHAMBER FOR AIR-BORNE SOLID FUEL
Filed Aug. 4, 1947 2 Sheets-Sheet 1
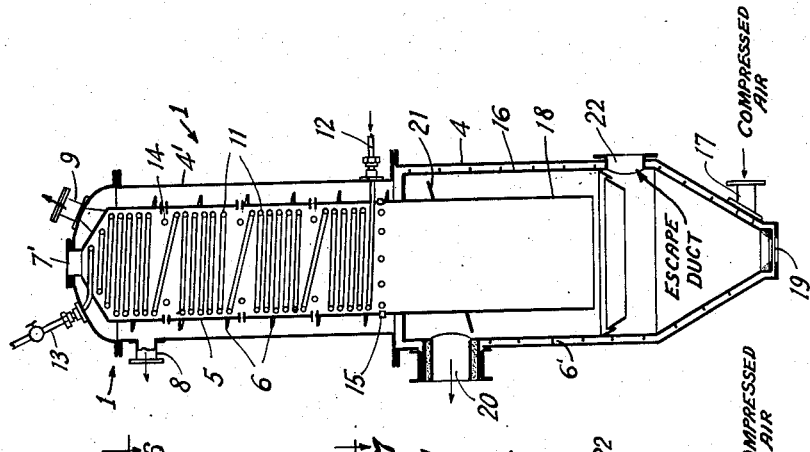
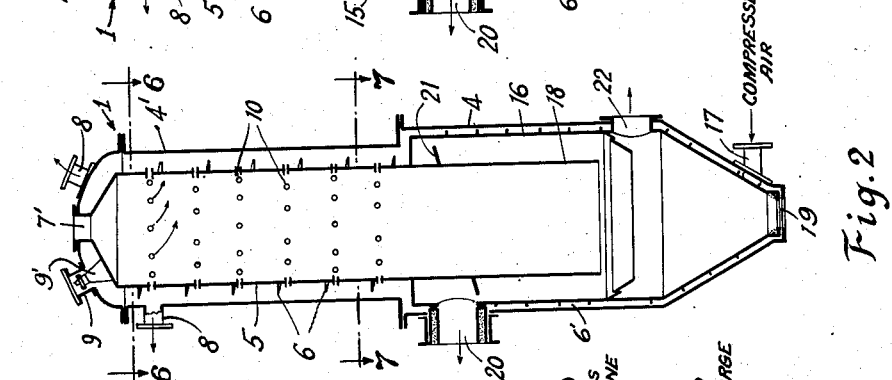
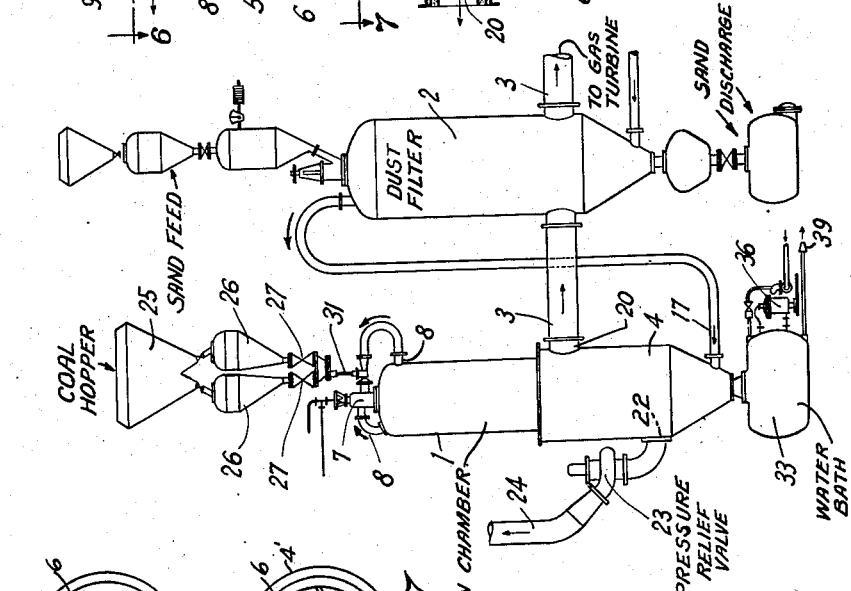
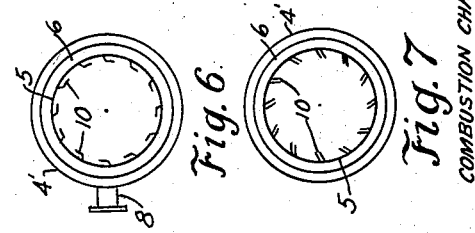
INVENTOR
Marcel Véron
BY
J. P. Moran
ATTORNEY Patented Mar. 16, 1954

2,672,012

UNITED STATES PATENT OFFICE 2,672,012

COMBUSTION CHAMBER FOR AIR-BORNE SOLID FUEL

Marcel Véron, Neuilly-sur-Seine, France, assignor to The Babcock & Wilcox Company, Rockleigh, N. J., a corporation of New Jersey Application August 4, 1947, Serial No. 765,878
In France July 3, 1941

Section 1, Public Law 690, August 8, 1946
Patent expires July 3, 1961

8 Claims. (Cl. 60—39.46)

The present invention relates to a method of and apparatus for the generation of motive fluids for gas turbines by the combustion of solid fuels in suspension.

It is known that gas turbines operate under the action of gases originating from the combustion, under pressure and at a high temperature, of solid, liquid or gaseous fuels. The gases produced by the combustion of solid fuels in suspension, such as, for example, pulverized coal, normally contains solid ash particles which are entrained therewith. Such gases, with entrained solid particles, are not suitable for use as a motive fluid for a gas turbine, and the entrained solid particles should be removed before their introduction into the turbine.

In accordance with my invention I provide a combustion chamber in which pulverized coal is burned under pressure, and in which the products of combustion are cooled and the larger ash particles are removed before discharging therefrom. A dust extractor or filter receives the gases originating in the combustion chamber and removes the entrained dust before the gases are admitted to the turbine to transform their heat energy into useful work in driving the turbine shaft.

The air required for the operation of the combustion chamber is delivered thereto under pressure by a compressor, which may be driven by the gas turbine. The air is utilized in the combustion of the fuel, to cool the products of combustion leaving the combustion chamber, and to cool the walls of the combustion chamber. In addition, the combustion chamber may be cooled not only by air, but in part by a suitable circulation of water.

The invention, therefore, aims essentially at the production of gases from the combustion of pulverized coal and the purification of the gases prior to their introduction into a gas turbine.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of my invention.

Of the drawings:

Fig. 1 represents schematically, viewed as a whole, an installation constructed in accordance with the present invention;

Fig. 2 shows, along a vertical section, an enlarged view of a modification of the combustion chamber, as shown in Fig. 1;

Fig. 3 is a view, in vertical section, of a similar combustion chamber provided with a cooling arrangement by means of water circulation;

Figure 5:
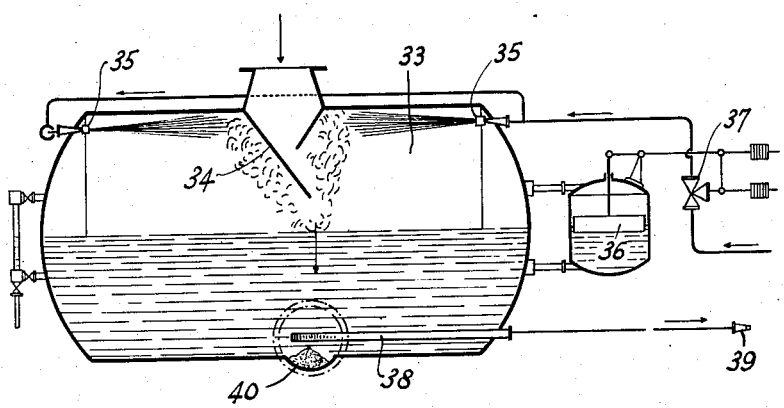

Fig. 5 shows, also in detail, the arrangement for the extraction and evacuation of the ashes originating from the combustion chamber; and Figs. 6 and 7 are section views taken on lines 6—6 and 7—7, respectively, of Fig. 2.

As will be seen from Fig. 1, the installation essentially is characterized by the combination of a combustion chamber 1 which is adapted to operate under pressure conditions for the combustion of pulverized coal, and a dust extractor 2 which is inserted in a duct 3 to conduct the hot gases under pressure from the chamber 1 to a gas turbine (not shown). The dust extractor 2 is intended to purify the combustion gases by the substantial elimination of the entrained dust or solid particles therein.

There will be herein described the particular construction of the combustion chamber and its complementary equipment, while the filter type dust extracting apparatus with its accessories disclosed herein is more specifically described and claimed in my co-pending application Serial No. 765,879, filed August 4, 1947, now Patent 2,564,316.

The combustion chamber 1 shown in detail in Fig. 2 includes a metallic cylindrical body 4' and a metallic cylindrical foundation 4 which is connected to the body 4' by a joint. For all practical purposes these two parts could be formed as a single body. The body 4' of the chamber 1 is provided internally with a spaced lining 5 of refractory or heat resistant steel which defines the combustion chamber proper, leaving between it and the body an annular space where the air under pressure, as necessary both for combustion and for cooling the chamber, is circulated. The air is uniformly distributed circumferentially of the lining 5 by means of the plates 6 which are wrapped as a helix about the lining 5 whereby the outer walls of the chamber 1 are cooled by the spiral movement of the air upwardly through the annular space. The body 4' and the lining 5 are closed at their upper ends by spaced cover plates having centrally located ports therethrough for a pulverized coal burner 7 which is of the mixing type receiving combustion air from pipes 8 and coal from feeder 31. A lighting opening 9 for a fuel oil burner is provided so that the installation may be put into operation by means of a torch. A capped housing 9' opens to the interior space of the combustion chamber 1. This lighting opening is closed by a quick-opening cover plate fitted to a flanged member on the exterior end of the port 9. The flanged outlets 8 are provided in the upper portion of the body 4' for the withdrawal of air from the annular space surrounding the lining 5 and delivery to a pulverized coal conduit connecting with the burner 7. The burner 7 is inserted in a port 7', as shown in Figs. 2 and 3, which is formed in the upper end portion of the combustion chamber and is in communication with the interior space defined by the lining 5.

The lining 5 is provided in its periphery with a suitable number of small nozzles or tubes 10 arranged in several rows for the entrance of air under pressure into the chamber 1. Some of these tubes are positioned in the upper portion of the chamber and are arranged with a tangential air inlet relative to the interior surface of the lining 5 of the combustion chamber, while other tubes are provided at a lower position for the jet introduction of air having radial and tangential components of motion relative to the lining of the combustion chamber. The former, tangential tubes, furnish jets of air in flat streams which hurl air against the inner wall of the lining 5 in the direction of the arrows shown in Fig. 2. These tubes serve the purpose of contributing to the cooling of the lining 5 of the combustion chamber since, as will be easily understood, layers of cooling air are located on both the inner and outer side of the lining 5. One layer of air circulates at a low speed in the annular space between the lining 5 and the body 4' of the chamber 1, wherein the cooling effect of this air circulation is further increased by the plates 6. The other layer of cooling air is introduced at high speed to the interior of the combustion chamber under the action of the tangentially directed air jets.

The air introduced from the tubes having radial and tangential components of flow with respect to the lining 5 of the combustion chamber, serve to insure the complete combustion of the fuel and the mixing of the gases. The action of these jets has the effect of imparting to the burning mass of air and fuel a rotational movement which causes a relative sliding of the different layers and consequently favors the diffusion of the oxygen in the gaseous atmosphere and around the grains of pulverized coal. They also contribute to the cooling of the combustion gases to the predetermined temperature established for their utilization.

The combustion chamber represented in Fig. 3 comprises a modification of the apparatus of Fig. 2 consisting in that the internal cooling of the combustion chamber is by means of a water cooled surface formed by a coil-shaped water pipe 11. A pump (not shown) produces an active circulation of water in the coil which enters at position 12 and leaves at position 13. The water circulation in the coil is regulable so the water or steam temperature at the exit position 13 may be controlled and the heat used for any purpose. The protective lining 5 of the combustion chamber is further provided with a certain number of tubes or nozzles for the introduction of air as in the embodiment shown in Fig. 2. The upper tubes 14, fewer in number than shown in Fig. 2 permit the entrance of combustion air into the mass of burning fuel, while the lower row of tubes 15 is used for the entrance of air serving to bring the temperature of the burned gases to the value established for their utilization in the gas turbine.

The foundation 4, as shown in both Figs. 2 and 3, is equipped internally with a protective jacket 16 of refractory steel externally supporting a plate 6' formed as a helix analogous to the plate 6 which also serves to circumferentially distribute the cooling air. All of the compressed air necessary for the operation of the combustion chamber is admitted at a flanged inlet 17 in the lower part of the foundation 4, so as to permit an upward flow of circulating air between parts 4 and 16, inwardly at the juncture of the parts 4 and 4', and thence upwardly in the cooling space between parts 4' and 5. The protective lining 5 of the combustion chamber extends into the foundation 4 to form a kind of skirt 18 which guides the burning gases so as to force them to reverse their direction of flow before leaving the chamber 1, and thus facilitates the precipitation of ashes in the lower part of the combustion chamber. The ashes are immediately evacuated through an orifice 19 at the bottom of the combustion chamber 1 while the gases rising around the outer periphery of the skirt 18 at a moderate rate escape through the flanged outlet connection 20. The entrance of the gas outlet 20 is partly masked by an annular baffle 21 which is inclined with respect to the horizontal and serves to equalize the distribution of gases circumferentially of the skirt 18 in the upward movement of the gases toward the outlet 20, by reason of the artificial restriction in the circumferential flow path. This structure also tends to prolong the vertical flow path of the gases as much as possible. From the outlet connection 20 the gases pass through the duct 3 through the dust extractor 2 and thus to the gas turbine.

An opening 22 is provided in the foundation 4 through which gases may be discharged to a pressure relief valve 23 as shown in Fig. 1 which is intended to avoid the effects of an accidentally increased pressure in the chamber 1 due to an accidental explosive combustion of the coal and air therein. Any increase in internal pressures within the combustion chamber beyond a selected value will open the valve 23 and permit a relief of gas pressure to the open air, through an escape duct 24.

Figure 4:
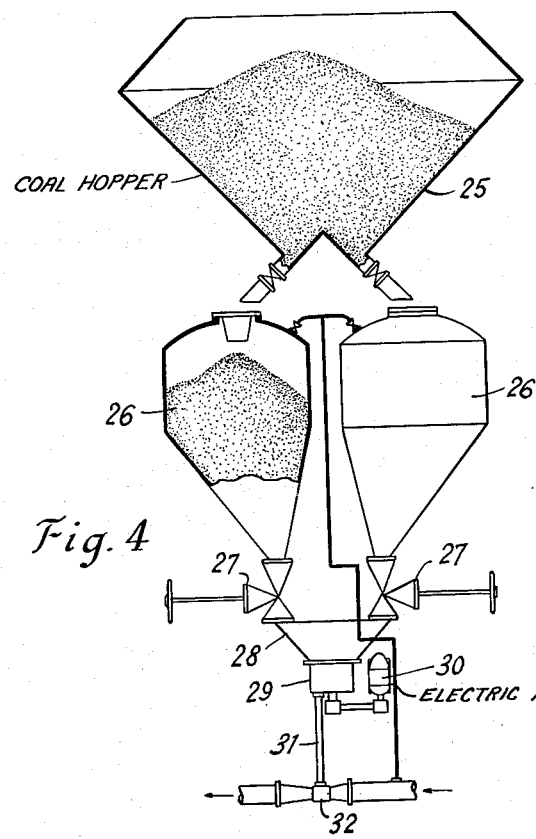
Fig. 4 is a somewhat more detailed view of the coal feeding arrangement of the combustion chamber.

The combustion chamber 1 is fired with pulverized coal by an installation disposed above the chamber and shown in detail in Fig. 4. This installation includes a storage hopper 25 for pulverized coal which is arranged with suitable spouts to distribute coal to two air-tight bins 26. The bins are filled from the hopper by operating quick-opening cover plates whereby the bins are alternately arranged in coal charging and discharging position. A special pneumatic gate valve 27 at the lower end of each bin 26 enables the pulverized coal to be discharged in any desired amount into a Y-pipe 28. The lower end of the pipe 28 is connected to a suitable feeder or distributor 29 which is controlled by a small electric motor 30. In leaving the distributor 29 the coal is passed through a flexible tube 31 to an injector 32 and thence to the burner 7 such as shown in Fig. 1. The injector 32 receives carrier or primary combustion air through a duct connecting with one of the openings 8 of the chamber 1 while secondary air is supplied to the burner 7 by a duct connected with the second opening 8. The combustion chamber may be continuously operated by this feeding arrangement since the pulverized coal may be introduced into the combustion chamber 1 despite the pressure prevailing therein and regardless of its rate of fuel consumption and the duration of the feeding cycle.

The ashes precipitated at the lower end of the foundation 4 of the combustion chamber 1, by reason of the change of direction in gas flow, are evacuated by means of a hydraulic device which is schematically shown in Fig. 1 and shown in detail in Fig. 5. This device consists of a tank or flask 33 fixed under the orifice 19 into which the ashes fall directly and are then instantly cooled in a water bath which is constantly renewed. The amount of steam produced due to high temperature particles falling into the water is in reality quite small. The steam formed in the flask 33 tends to rise vertically but cannot get into the combustion chamber because of the arrangement of a deflector plate 34 which directs the steam into a stream of atomized water where it is immediately condensed. The water is atomized by the nozzles 35.

The level of the water in the flask 33 is maintained substantially constant through the operation of a float 36 which actuates an automatic regulator through a water flow valve 37. The atomized water projected from the nozzle 35 is combined with the condensate of the steam produced in cooling the ash and is discharged through a pipe 38 which in turn opens to the open air through a small diameter tube 39. The tube 39 is arranged with a small diameter to maintain the pressure of water in the flask. The evacuation of water and ash particles is continuous and effective due to the large volume of water used in relation to the volume of ash collected. Ash particles which may have agglomerated or which are too voluminous to pass through the strainer of the pipe 38 finally fall into a position 40 in front of an opening in the bottom of the flask 33, from which they may be periodically removed.

If, by way of exception, a certain quantity of steam produced by the hot ash particles nevertheless gets into the combustion chamber, its presence in the gases have no unfavorable consequences, since the quantity will be very small due to the small amount of vaporization in the flask 33. If necessary, a device for the evacuation of dry ash which is described in my said co-pending application, previously mentioned, would be suitable as a substitute for the hydraulic device herein described.

It will be noted that the invention includes a combustion chamber for burning pulverized coal and a filtering type of dust collector arranged for the removal of entrained ash in the gaseous products of combustion prior to their delivery as a motive fluid to a gas turbine. The combustion chamber is of a cylindrical shape to advantageously withstand high pressure combustion and is arranged for the downward introduction of pulverized coal thereto. The combustion chamber walls are cooled by heat exchange with combustion air, with the air thereafter introduced into the combustion space in directions intended to effect cooling of the interior surfaces of the combustion chamber and of the gaseous combustion products before their discharge therefrom. An abrupt change in the direction of combustion gas flow in leaving the combustion space tends to separate the coarser ash particles from the gas stream and to deposit some of the ash in the bottom of the combustion chamber from which they may be removed. A pressure relief valve permits an escape of gas to the atmosphere when the pressure within the combustion chamber exceeds a predetermined, safe value.

The high pressure, high temperature gases resulting from the combustion of pulverized coal in the combustion chamber are directed through a separate dust filter for cleansing before delivery as a motive fluid to an associated gas turbine. The detailed construction of the dust filter is described in my previously mentioned co-pending application. In general, the filter is arranged to receive the dust laden gaseous combustion products and to remove the dust by filtration in passing through a filtering medium. The filtering medium, such as sand, is arranged in beds with a large area so that the flow of gas therethrough will be at a low velocity for efficient dust removal and a low pressure drop. The large area of filtration is obtained in a small unit by arranging the filtering beds in a plurality of rings for parallel gas flow. After the removal of substantially all of the entrained ash in the gaseous products resulting from the combustion of pulverized coal the gases are suitable for use as a motive fluid for a gas turbine.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A furnace for burning solid fuels in suspension comprising a wall defining an elongated combustion chamber, a mixing type burner positioned at the one end of said combustion chamber, a second wall exteriorly spaced from and surrounding the end portion of said combustion chamber wall remote from said burner and forming an annular gas pass therebetween in communication with the end of said combustion chamber, means forming a gas outlet in said second wall disposed intermediate the length of said combustion chamber and adjacent the end of said second wall, and an annular baffle positioned in said annular gas pass upstream of said gas outlet, and means for cooling the wall of said combustion chamber including a casing exteriorly spaced from and surrounding the wall of said combustion chamber adjacent said burner and said second wall to define an annular passageway between the casing and both of said walls, means for introducing superatmospheric pressure air to said annular passageway, and a series of nozzles positioned in the wall of said combustion chamber to direct a flow of air from said annular passageway over the inner surface of said combustion chamber wall.

2. Apparatus for supplying motive fluid to a gas turbine comprising metallic walls defining an elongated combustion chamber having an upper body portion and a lower foundation portion of enlarged cross-sectional area, a lining within said body portion spaced therefrom to define an air chamber therebetween, an internal jacket spaced from said foundation portion to define an air chamber therebetween having a lower air inlet connection thereto, said air chambers being in air flow communication, a metallic skirt extension of said lining projecting into the lower portion of said combustion chamber and defining a discharge passageway between the skirt and the jacket of the lower wall portion of said combustion chamber, a burner arranged to introduce an ash-containing fuel into the upper end of said combustion chamber, nozzles positioned in said lining adjacent said burner arranged to supply secondary combustion air to said combustion chamber from said air chamber, additional nozzles in said lining spaced below said secondary air nozzles for the introduction of air into the upper portion of said chamber in excess of fuel combustion requirements, and means for separating coarse ash particles from the gaseous products of combustion leaving said combustion chamber prior to their delivery to a gas turbine.

3. Apparatus for supplying motive fluid to a gas turbine comprising metallic walls defining an elongated combustion chamber having an upper body portion and a lower foundation portion of enlarged cross-sectional area, a lining within said body portion spaced therefrom to define an air chamber therebetween, an internal jacket spaced from said foundation portion to define an air chamber therebetween having a lower air inlet connection thereto, said air chambers being in air flow communication, a metallic skirt extension of said lining projecting into the lower portion of said combustion chamber and defining a discharge passageway between the skirt and the jacket of the lower wall portion of said combustion chamber, a burner arranged to introduce an ash-containing air-borne fuel into the upper end of said combustion chamber, nozzles positioned in said lining adjacent said burner arranged to supply secondary combustion air to said combustion chamber from said air chamber, additional nozzles in said lining spaced from said secondary air nozzles for the introduction of air into the upper portion of said chamber in excess of combustion requirements, means for separating coarse ash particles from the gaseous products of combustion leaving said combustion chamber prior to their delivery to a gas turbine, a flask arranged to receive and to quench said ash particles in water, a nozzle arranged to discharge said quenched ash particles and water from said flask, and a float arranged to regulate the flow of water to said flask.

4. A furnace for burning solid fuels in suspension comprising a wall defining an elongated combustion chamber, a mixing type burner positioned at the one end of said combustion chamber, a second wall exteriorly spaced from and surrounding the end portion of said combustion chamber wall remote from said burner and forming an annular gas pass between said walls in communication with the end of said combustion chamber, means forming a gas outlet in said second wall disposed intermediate the length of said combustion chamber, and means for cooling the wall of said combustion chamber including a casing exteriorly spaced from and surrounding the wall of said combustion chamber adjacent said burner and said second wall to define an annular passageway between the casing and both of said walls, means for introducing superatmospheric pressure air to said annular passageway, and a series of nozzles positioned in the wall of said combustion chamber to direct a flow of air from said annular passageway over the inner surface of said combustion chamber wall.

5. A furnace for burning solid fuels in suspension comprising metallic walls defining a combustion chamber, a mixing type burner positioned at one end of said combustion chamber, and arranged to discharge air-borne coal longitudinally into said chamber, a second metallic wall exteriorly spaced from and surrounding the end portion of said combustion chamber wall remote from said burner and forming an annular gas pass therebetween in communication with the end of said combustion chamber, means forming a gas outlet in said second wall disposed intermediate the length of said combustion chamber, and means for cooling the wall of said combustion chamber including a casing exteriorly spaced from and surrounding the wall of said combustion chamber adjacent said burner and said second wall to define an annular passageway between the casing and both of said walls, means for introducing superatmospheric pressure air to said annular passageway, and a series of nozzles circumferentially spaced in longitudinally spaced rows in the wall of said combustion chamber to direct a flow of air from said annular passageway into said combustion chamber, the nozzles adjacent said burner arranged to discharge combustion air jets tangentially impinging in cooling relationship upon the internal surface of said metallic walls, the remaining nozzles arranged to discharge jets of excess air into said combustion chamber in directions having radial and tangential components with respect to said metallic wall to cool the products of combustion.

6. A furnace for burning solid fuels in suspension comprising a metallic wall defining an elongated combustion chamber, a burner centrally positioned at one end of said combustion chamber, means for delivering air-borne solid fuel at a superatmospheric pressure to said burner, means for separating cinders from the gases of combustion prior to discharge from said combustion chamber by a substantial reversal of gas flow direction, and means for cooling the metallic wall of said combustion chamber including a casing surrounding said combustion chamber and defining an annular passageway therebetween for flow of air, a series of nozzles longitudinally spaced along and in the combustion chamber wall arranged to direct a flow of combustion air into said combustion chamber to sustain combustion of said fuel and to cool the products of combustion, and a fluid cooled coil arranged to cool the interior surface of said combustion chamber.

7. A furnace for burning fuels in suspension comprising walls defining an elongated combustion chamber having an upper body portion of substantially uniform cross-sectional area and a lower foundation portion of enlarged cross-sectional area with an inverted frusto-conical bottom, a lining within said body portion spaced therefrom to define an air chamber therebetween, an internal jacket spaced from said foundation portion to define an air chamber therebetween having a lower air inlet connection thereto, said air chambers being in air flow communication, a metallic skirt extension of said lining projecting into said lower portion to a spaced position above said bottom and defining a discharge passageway between said skirt and the jacket of said lower portion for combustion gases generated in said combustion chamber, a burner arranged to introduce an ash-containing fuel into the upper end of said combustion chamber, nozzles positioned in said lining adjacent said burner arranged to supply secondary combustion air to said combustion chamber from said air chamber, and additional nozzles in the lining of said upper portion spaced below said burner and arranged to supply cooling air from said air chamber into the products of combustion.

8. A furnace for burning fuels in suspension comprising metallic walls defining an elongated combustion chamber having an upper body portion of substantially uniform cross-sectional area and a lower foundation portion of enlarged cross-sectional area with an inverted frusto-conical bottom, a lining within said body portion spaced therefrom to define an air chamber therebetween, an internal jacket spaced from said foundation portion to define an air chamber therebetween having a lower air inlet connection thereto, said air chambers being in air flow communication, a metallic skirt extension of said lining projecting into said lower portion to a spaced position above said bottom and defining a discharge passageway between said skirt and the jacket of said lower portion for combustion gases generated in said combustion chamber, a plate helically wrapped about the exterior surface of said lining within the upper portion of said combustion chamber, a burner arranged to introduce an ash-containing fuel into the upper end of said combustion chamber, nozzles positioned in said lining adjacent said burner arranged to supply secondary combustion air to said combustion chamber from said air chamber, and additional nozzles in the lining of said upper portion spaced below said burner and arranged to supply cooling air from said air chamber into the products of combustion.

MARCEL VÉRON.

References Cited in the file of this patent

UNITED STATES PATENTS

| Number | Name | Date |
|---|---|---|
| 730,782 | Morrison | June 9, 1903 |
| 1,180,792 | Norrman | Apr. 25, 1916 |
| 1,314,175 | Wells | Aug. 26, 1919 |
| 1,608,446 | Trent | Nov. 23, 1926 |
| 1,618,808 | Burg | Feb. 22, 1927 |
| 1,656,991 | Schwartz | Jan. 24, 1928 |
| 1,698,552 | Lundgren | Jan. 8, 1929 |
| 1,734,669 | Frisch | Nov. 5, 1929 |
| 1,819,174 | Jacobus | Aug. 18, 1931 |
| 1,910,735 | Zikesch | May 23, 1933 |
| 1,911,501 | Grady | May 30, 1933 |
| 1,948,537 | Noack | Feb. 27, 1934 |
| 1,969,501 | Chapman | Aug. 7, 1934 |
| 2,187,627 | Noack | Jan. 16, 1940 |
| 2,275,394 | Hardgrove | Mar. 3, 1942 |
| 2,332,866 | Müller | Oct. 26, 1943 |
| 2,398,654 | Lubbock et al. | Apr. 16, 1946 |
| 2,601,390 | Hague | June 24, 1952 |

FOREIGN PATENTS

| Number | Country | Date |
|---|---|---|
| 484,289 | Great Britain | May 3, 1938 |